UNITED STATES PATENT OFFICE 2,166,233

PROCESS OF PREPARING ANTINEURITIC SUBSTANCES

Edwin R. Buchman, Pasadena, Calif., assignor to Research Corporation, New York, N. Y., a corporation of New York No Drawing. Application June 17, 1938, Serial No. 214,316. Renewed May 2, 1939

8 Claims. (Cl. 260—251)

This invention relates to the production of antineuritic substances and has for its object the provision of a simple and effective method of producing such a substance.

In accordance with the invention, the compound 2-methyl-6-amino-5-pyrimidyl acetic acid, is treated with bromine, preferably in the presence of phosphorous trichloride as catalyst, to produce 2 - methyl - 6-amino-5-pyrimidyl-brom-acetic acid. The latter compound is then condensed with 4-methyl-5-β-hydroxy-ethyl thiazole to produce vitamin B1 as shown by biological assay for antineuritic activity of the reaction mixture.

The invention will be fully understood from the following detailed description of a specific example thereof:

The 2-methyl-6-amino-5-pyrimidyl acetic acid is prepared by hydrolizing the corresponding amide with an alkali. For example 2-methyl-6-amino-5-pyrimidyl acetamide having the formula:

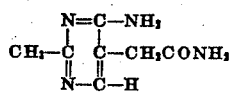

(prepared in accordance with the method described in Berichte 70, 2046, 1937) may be hydrolized by treatment with 10% potassium hydroxide solution and heating the mixture on a water bath for about one and a half hours. The mixture may then be neutralized with an acid, e. g., hydrochloric acid, cooled and filtered. The material collected may be recrystallized from water, if desired, to further purify it.

To 100 mgs. of the resulting 2-methyl-6-amino-5-pyrimidyl acetic acid are added .05 cc. of bromine containing two drops of PCl3 per cc. of bromine, the material is sealed in a tube and heated for one hour at 70° to 75° C. The tube is then opened, the contents are extracted with acetone or water and the extract is evaporated to dryness in vacuo. The residue contains, as the desired product of reaction, the substance 2-methyl-6-amino-5-pyrimidyl-brom-acetic acid hydrobromide formed by the following reaction:

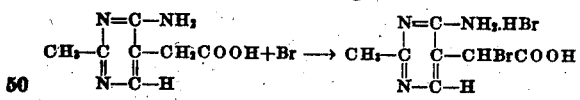

The product is then heated at 120° C. for twenty minutes with an equal quantity of 4-methyl-5-β-hydroxy-ethyl thiazole and a small quantity of butyl alcohol. The reaction product exhibits appreciable antineuritic activity when tested by its effect upon polyneuritic rats and also promotes the growth of the fungus Phycomyces in a manner characteristic of vitamin B1 salts. The dose required for the cure of a polyneuritic rat is not in excess of 0.4 mg. of the substance.

The evidence thus indicates that the substituted pyrimidine and the thiazole condense with simultaneous decarboxylation to produce the bromide-hydrobromide of vitamin B1, according to the equation:

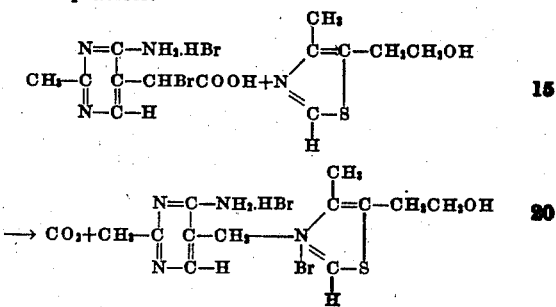

The thiazole used in the latter condensation may be prepared in accordance with the method which I have described in the Journal of the American Chemical Society, 58, 1803 (1936).

The product may be used in its crude form or may be further purified by extraction methods well-known in the art. If desired, the vitamin B1 bromide-hydrobromide present may be converted to the chloride-hydrochloride or other sa'ts by known methods.

From the foregoing, it is evident that this invention provides a simple, yet effective, method of preparing vitamin B1 in usable form.

What is claimed is:

1. The method of preparing vitamin B1 which comprises condensing 2-methyl-6-amino-5-pyrimidyl-brom-acetic acid with 4-methyl-5-β hydroxy-ethyl-thiazole.

2. The method of preparing an antineuritic substance, which comprises treating 2-methyl-6-amino-5-pyrimidyl-acetic acid with bromine and condensing the resulting product with 4-methyl-5-β hydroxy-ethyl-thiazole.

3. The method of preparing the antineuritic vitamin, which comprises treating 2-methyl-6-amino-5-pyrimidyl-acetic acid with bromine and condensing the resulting product with 4-methyl-5-β hydroxy-ethyl-thiazole in the presence of butyl alcohol.

4. The method of preparing the antineuritic vitamin, which comprises treating 2-methyl-6- amino-5-pyrimidyl-acetic acid with bromine in the presence of phosphorous trichloride and condensing the resulting product with 4-methyl-5-β hydroxy-ethyl thiazole.

5. The method which comprises treating 2-methyl-6-amino-5-pyrimidyl-acetic acid with bromine.

6. The method which comprises treating 2-methyl-6-amino-5-pyrimidyl-acetic acid with bromine in the presence of phosphorous trichloride.

7. The method which comprises treating 2-methyl-6-amino-5-pyrimidyl-acetamide with an alkali and treating the resulting product with bromine.

8. The compound 2-methyl-6-amino-5-pyrimidyl-brom-acetic acid.

EDWIN R. BUCHMAN.